Aug. 25, 1964     T. L. WILLIAMS     3,145,560
TESTING MEANS FOR AUTOMOTIVE EQUIPMENT
Filed Jan. 4, 1963
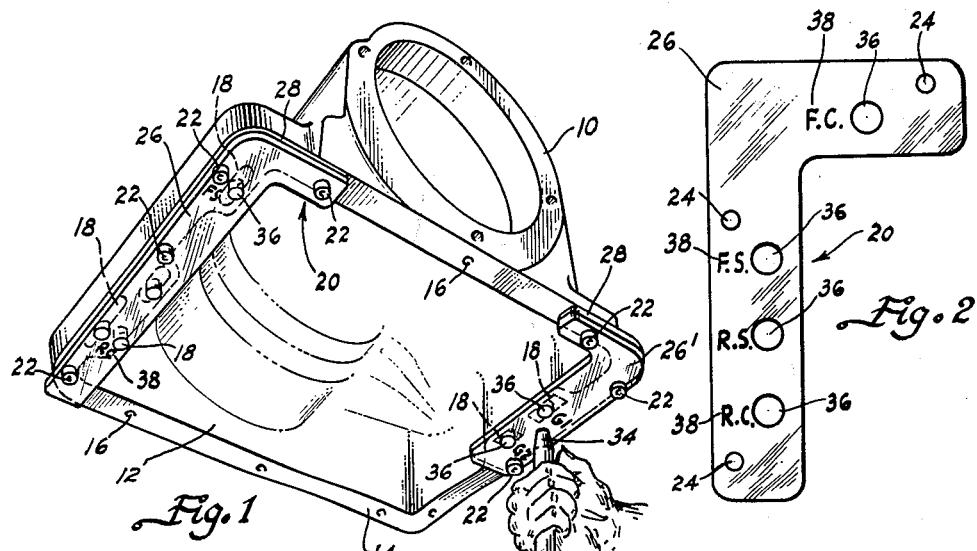
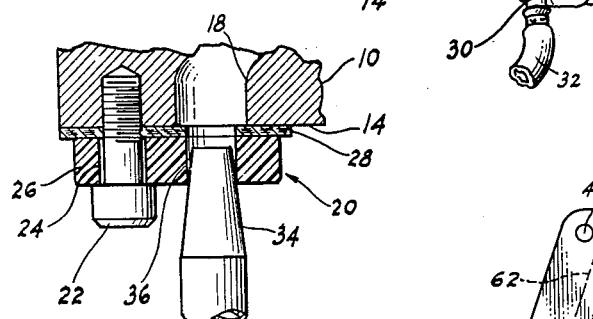
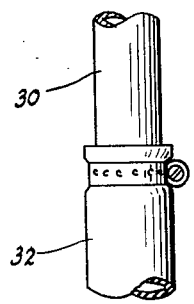
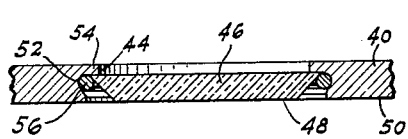
INVENTOR
THOMAS L. WILLIAMS
By    *[signature]*
ATTORNEY

United States Patent Office 3,145,560
Patented Aug. 25, 1964

3,145,560
TESTING MEANS FOR AUTOMOTIVE EQUIPMENT
Thomas L. Williams, 32 Stanmore Road, Warwick, R.I.
Filed Jan. 4, 1963, Ser. No. 249,469
10 Claims. (Cl. 73—49.7)

This invention pertains to means for testing fluid-operated mechanisms of which automotive equipment and, more particularly, automotive automatic transmissions comprise a substantial class, to determine if the same are functioning properly or if they are not, which parts or units thereof are malfunctioning.

The complexity of certain equipment of this type and, more particularly, automatic transmission has posed problems concerning the testing and repairing thereof for a substantial period of time. The increasing, widespread use of automatic transmissions renders this problem even more pressing because the disassembly and repair of such mechanisms is among the more expensive operations required to maintain automotive equipment in operative condition. Though, as in regard to many items in automotive equipment, it sometimes is possible to obtain a reasonably reliable indication of any misfunctioning or malfunctioning part thereof simply by listening or feeling in various ways, resorting to such means for testing automatic transmissions is far from satisfactory and is quite highly unreliable. Thus, at present, unless it is possible as in a limited number of instances, to determine a worn, broken, or otherwise malfunctioning element of an automatic transmission simply by inspecting the same when the housing is opened for that purpose, the only practical way to determine accurately any misfunctioning or malfunctioning element or elements in such transmission in the majority of instances at present is to remove the automatic transmission from the vehicle, disassemble the same and carefully inspect the various complex elements while so disassembled. Obviously, this is an expensive procedure.

It is the principal purpose of the present invention to provide means for testing the operation of fluid-operated mechanisms, such as automotive automatic transmissions, by providing means by which fluid, especially gaseous fluid, can readily be applied quickly and conveniently through the use of nozzle means to the open ends of passages or conduits which usually are provided adjacent or within the housing walls of such fluid-operated mechanisms, whereby the application of pressure supplied by such fluid will cause the particular element of the mechanism with which the open end of said passage or conduit communicates to function suitably to determine whether there is sufficient wear that undue leakage occurs, or whether the element is functioning at all or adequately, whereby the condition of each element in the mechanism which can be tested by the application of fluid pressure thereto can be inspected and a determination made, with close accuracy in most instances, of the present condition of the various elements of the mechanism.

Another object of the invention is to provide a plate-like adapter member which may be secured, and preferably sealed through the use of a gasket, to some or all of the periphery of an automatic transmission housing, for example, and notwithstanding the fact that the open ends of the passages and conduits in said housing vary in size, the adapter member has nozzle-receiving openings of uniform size, whereby a single nozzle complementary to such openings may be utilized selectively with any one of them by permitting a relatively gas-type fit between the nozzle and any one of said openings so as to afford maximum use of the gaseous pressure in testing the functioning of a transmission.

A further object of the invention is to provide suitable observation means in the adapter member of the test equipment comprising the present invention, said observation means being of several types in accordance with the principles of the invention, certain of these comprising transparent closures.

Still another object of the invention is to provide an adapter member of the type referred to above having appropriate indicating means adjacent the nozzle-receiving openings therein, such indicating means being of a codified nature or otherwise indicative of the part of portion of the transmission with which the open end of the passage or conduit adjacent any particular nozzle-receiving opening communicates, thereby eliminating, or at least greatly minimizing, the need for using service manuals to identify the various passages and conduits in regard to which testing is to be made.

Details of the foregoing objects and of the invention, as well as other objects thereof, are set forth in the following specification and illustrated in the drawing comprising a part thereof.

In the drawing:

FIG. 1 is a perspective view of an exemplary automatic transmission housing from which the oil pan and valve body assembly have been removed so as to expose the interior of the transmission and the open ends of passages and conduits therein, said figure also showing several exemplary means for testing the operation of the transmission affixed to said housing and an air nozzle connected to one of the nozzle-receiving openings in said testing means.

FIG. 2 is a plan view of an exemplary adapter member corresponding generally to one of those illustrated in FIG. 1 but being shown on a larger scale than in FIG. 1.

FIG. 3 is a vertical sectional view of a fragmentary portion of a transmission housing to which an adapter member is connected in accordance with the principles of the invention and illustrating, on a still larger scale than in FIG. 2, a preferred method of attaching an air nozzle to the adapter member.

FIG. 4 is a plan view of another type of adapter member embodying the principles of the invention, this type being one which preferably is formed of metal and covers the entire open face of the transmission housing but having a transparent window-type viewing means therein to permit the visual observation of the functioning of the transmission mechanism while being tested.

FIG. 5 is a fragmentary transverse sectional view on the line 5—5 of FIG. 4 and illustrating details of one manner of securing the window means to the adaptor member.

Referring to the drawing, and particularly FIG. 1 thereof, there is illustrated therein an exemplary transmission housing which is representative of automotive equipment to which the present invention pertains. It is not uncommon for each different make of automotive vehicle to have a different type or style of transmission, whereby the shapes and internal mechanism thereof are different but, in general, there are certain basic units or details of mechanism in such transmissions which are substantially common to all makes such as clutches, "Servos," governors, and the like. In reducing the present invention to practical form, it is realized that a number of different sizes and shapes of test equipment, but all applying similar basic principles, will have to be provided in order to adapt the invention to any substantial segment of the entire automotive industry. Accordingly, especially for purposes of simplifying the illustration in the drawing of this application, a typical type of transmission is shown in FIG. 1, but it is to be understood that this is merely exemplary of a wide range or line of transmissions to which the present invention is applicable in one form of adaptor member or another, details of which are set forth hereinafter.

In FIG. 1, the housing 10 of an exemplary automatic transmission has an open face 12 defined by a rim 14 to which a valve body assembly, not shown, and a cover or oil pan, likewise not shown, normally are attached by appropriate screws or bolts connectable to the threaded bolt hole 16 therein. In arranging the transmission for testing, the hydraulic fluid first is drained from the housing, after which the non-illustrated oil pan and valve body assembly are removed from the housing so as to expose the interior thereof through the open face 12. The various components of the transmission are quite readily observable through said open face. However, it is not possible to operate the various elements of the transmission under such circumstances due to the absence of hydraulic fluid to apply pressure to cause the various elements or units of the transmission to function in accordance with their intended operation.

The various elements and units of the transmission referred to normally are operated by hydraulic fluid transmitted thereto by various passages and conduits molded into the housing 10 of the transmission, or otherwise disposed therein, whereby when the oil pan and valve body assembly have been removed so as to expose the rim 14 of the housing 10, the open ends 18 are exposed, these being shown in exemplary manner in FIG. 1 as being of different sizes and shapes.

According to the basic concept of the present invention, which contemplates the application of gaseous fluid under pressure, preferably air, to said open ends 18 of the passages and conduits, the different shapes and sizes of said open ends poses a problem of conveniently directing air therethrough under pressure. In certain transmissions, a rather substantial number of different sizes of such open ends exist, whereby to supply a different size and shape of nozzle for each different size or shape of open end of such passage or conduit is highly impractical and also would comprise a substantial nuisance, due particularly to having to apply the correct size and shape of nozzle to the complementary size and shape of open end 18 when air pressure is to be applied to any particular passage or conduit of a substantial number of different sizes and shapes thereof in any particular transmission.

To obviate the foregoing difficulty, the present invention contemplates the use of exemplary adapter means 20 which is of appropriate shape to be attached at least to a portion of the rim 14 of the housing 10, preferably by the use of screws or bolts 22 which are, conveniently, the same as those which secure the valve body assembly and/or oil pan to the housing, whereby the adaptor means 20 is provided with appropriate screw holes 24 to accommodate the screws or bolts 22.

The adaptor means 20 preferably is a plate-like member 26 which may be formed from any suitable material such as a rugged type of synthetic resin which, for example, may be of the order of ¼ inch or ⅜ inch in thickness. Also, any appropriate metal, such as aluminum or other suitable, durable metal, is satisfactory too. If synthetic resin is utilized, it preferably is of the transparent type in order that it will comprise viewing means especially when the adaptor means are of such nature as to cover a substantial part or all of the open face 12 of the transmission housing 10, as is contemplated in accordance with the principles of the invention especially in regard to certain shapes of transmissions where that type of adaptor means would prove most convenient. In addition to viewing the operation of portions of the mechanism being tested, certain elements and units thereof are tested by listening to the same while applying such gaseous pressure, thereby affording audio detection.

Incident to connecting the adaptor member 26 to its desired location upon the rim 14 of the housing 10, a suitable gasket 28, formed of any appropriate material, is employed. The gasket preferably is complementary in shape to that portion of the rim 14 of the housing 10 which is covered by the adaptor member 26 when affixed thereto. Such gasket affords maximum efficiency of the air pressure when applied to the open ends 18 of the passages or conduits.

An important aspect of the present invention comprises the use of a preferably simple nozzle 30 which is connected by a flexible tube 32 to a source of gaseous fluid, such as air, and the terminal end 34 of the nozzle is preferably tapered and is complementary in shape to a series of nozzle-receiving openings 36, all of which are uniform in size and shape. Accordingly, only a single nozzle 30 is required to service each open end 18 of the various passages and conduits in the housing 10, regardless of the size and shape of said open ends. Further, by rendering the terminal end 34 of the nozzle 30 readily complementary and quickly connectable, preferably in air-tight relationship, to the nozzle-receiving openings 36, efficient use of the gaseous fluid results, such efficiency being enhanced by the use of the gasket 28. An exemplary and detailed illustration of such arrangement is illustrated in exemplary manner in FIG. 3.

In the exemplary illustration of the adaptor means of the present invention in FIG. 1, it will be seen that in addition to adaptor member 26 being illustrated, an additional adaptor member 26' also is shown affixed to the opposite side of the housing 10 from adaptor member 26. The additional member 26' however is secured to the rim 14 of the housing by screws or bolts 22 passing through suitable screw holes provided therefor in member 26', said member also having nozzle-receiving openings 36 of the same shape and size as corresponding openings in adaptor member 26. In FIG. 1, the nozzle 30 is shown being held in receptive contact by the operator with one of the nozzle-receiving openings 36 in the adaptor member 26'. If desired, the nozzle 30 may be of the type having a finger-operated release valve thereon to control air flow, it being understood that any suitable commercial valve of this type may be employed in accordance with the principles of the invention since the valve per se is not part of the novelty of the present invention.

For purposes especially of facilitating the determination of the element or unit of the transmission to be tested, particularly without requiring reference to a service manual to ascertain the same, the present invention also contemplates the employment of indicating means 38 which, preferably, are of the simplest type to aid the mechanic or service man in determining the nozzle-receiving opening to which he desires to apply nozzle 30 for purposes of testing a given or desired unit or element of the transmission. In the exemplary indicia or indicating means 38 illustrated in FIGS. 1 and 2, a simple code has been employed such as FS, which stands for Front Servo; RS which stands for Rear Servo; RC which stands for Rear Clutch; and FC which stands for Front Clutch. It is to be understood of course that any other suitable code may be employed in such indicating means, all for purposes of facilitating the efficiency of the mechanic or attendant.

Especially for purposes of illustrating an adaptor member which is designed to cover a more extensive area, or even the entire area of the open face 12 of the transmission 10, there is illustrated in FIG. 4, a plate-like adaptor member 40 which is of a shape complementary to an exemplary open face of a transmission housing. The member is provided with a plurality of screw holes 42 by which the member is secured over the open face of an automatic transmission. If desired, the member 40 may be made from transparent synthetic resin. However, as illustrated in FIG. 4, the member 40 preferably is made from non-transparent material such as aluminum or any other suitable metal. In order to provide viewing means therein by which an attendant may observe the operation of the various elements or units of the transmission while being tested, the plate 40 is provided with a viewing opening 44 therein which preferably is of some suitable regular shape, such as circular, whereby a relatively inexpensive transparent closure 46, which may be made from suitably treated glass, transparent, synthetic resin, or the like.

Preferably, the surface 48 of the viewing closure 46 is in the same plane as the surface 50 of member 40 which is disposed innermost when the member 40 is affixed over the open face of a transmission, for purposes to be described. Any suitable relatively simple construction may be employed for mounting the closure 46 within the opening 44 of member 40. For example, the member 40, adjacent the viewing opening 44, may be provided with an annular undercut groove 52, thereby forming an annular flange 54 against which the transparent lens or closure 46 abuts for purposes of receiving a snap-ring 56, or the like, for firmly securing the closure 46 relative to viewing opening 44.

To provide a ready concept of a variety of shapes of open ends of passages or conduits within the transmission housing relative to which the present invention is adapted to be used, there is illustrated in exemplary manner in FIG. 4, a plurality of different shapes and sizes of such open ends 58, shown in broken lines, some of these being in the nature of slots of various lengths and widths, while others are in the nature of circular holes. To provide a concept of the convenience of the present invention, it will be seen that in relation to each of the various sizes and shapes of open ends 58, there is a nozzle-receiving opening 60 adjacent and communicating directly with each of said open ends 58.

If desired, one of the nozzle-receiving openings 60 may be provided in the transparent closure 46, as illustrated in FIG. 4, relative to an exemplary additional open end 58 substantially coaxial therewith. In view of the fact that the inner surface 48 of said transparent closure 46 is in the same plane as the inner surface 50 of the adaptor member 40, appropriate gasket means may be used adjacent the inner surface 48 of the transparent closure 46 in order to effect suitable sealing with the open end 58 of the passage or conduit with which it communicates. It also will be understood that a gasket of appropriate shape and having the required openings therein is to be used with the member 40 as indicated by the dotted line 62.

Also, as in regard to the preceding embodiments of the invention illustrated in FIGS. 1 through 3, it is contemplated that the nozzle-receiving openings 60 be provided with appropriate indicating means 64, there being a number of additional symbols or indica shown in FIG. 4 over those illustrated in FIGS. 1 and 2, such as FP, which stands for Forward Pump; G1 which indicates one governor valve; while G2 indicates a second governor valve; RP which stands for Rear Pump; and TC which stands for Torque Convertor. As in regard to the preceding embodiments, these indicating means are intended to be exemplary only and various other types of modified indicating means or other coded indica may be employed, all for the purpose of facilitating the operation of the mechanic and minimizing or eliminating the use of service manuals in regard to the application of gaseous pressure to the adaptor member for testing any desired element or unit of the transmission.

Although the foregoing description has been directed specifically to automatic automotive mechanism such as an automatic transmission, it is to be understood that, especially in its broader sense, the invention is applicable to the testing of many types of fluid-actuated mechanisms, regardless of whether the mechanism is actuated by liquid or gaseous fluid. Further, while the use of gaseous fluid for testing purposes is preferred in accordance with the principles of the invention, primarily because of the non-messiness of it, it is to be understood that liquid fluid may be used for testing purposes if desired and especially if necessary to produce required results.

While the invention has been described and illustrated in its several preferred embodiments, it should be understood that the invention is not to be limited to the precise details herein illustrated and described since the same may be carried out in other ways falling within the scope of the invention as claimed.

I claim:

1. Means for testing the operation of mechanism normally actuated by fluid under pressure within a sealed housing embodying passages and conduits arranged to conduit said fluid to certain movable elements of said mechanism and having a portion of said housing removable to expose said mechanism and openings in said passages and conduits, said testing means comprising an adaptor attachable to said housing adjacent at least one of said openings in said passages and conduits and having nozzle-receiving opening means therein, and nozzle means connectable to a source of fluid under pressure and detachably engageable with said nozzle-receiving means in said adaptor substantially in gas-tight relationship, whereby upon the application of fluid under pressure to said nozzle means the mechanism connected to the passage or conduit receiving said fluid is caused to operate for testing purposes under conditions permitting the observation of the operation of the exposed mechanism.

2. The testing means according to claim 1 further characterized by said adaptor having a plurality of similar nozzle-receiving openings therein each capable selectively of receiving said nozzle means and transmitting fluid to the passage or conduit in communication therewith regardless of the size of said openings in said passages and conduits.

3. Adaptor means for testing the operation of automatic automotive transmissions normally operated by hydraulic fluid transmitted through passages and conduits of different cross-sectional areas and shapes within or upon a housing having a separable valve body assembly and the removal of which exposes open ends of said passages and conduits, said adaptor means comprising a plate-like member having at least two similar nozzle-receiving openings extending therethrough and positioned to communicate with a corresponding number of open ends of said passages and conduits when said valve body assembly is removed from said housing and said adaptor means is connected to said housing, and nozzle means complementary in shape to said receiving openings in said plate-like member and receivable selectively in said openings in relatively gas-tight relationship to permit the application of gaseous fluid under pressure to a selected passage or conduit to cause the operation of part of a transmission connected thereto and permit visual or audio observation of such operation.

4. The adaptor means according to claim 3 further characterized by said plate-like member having holes therein positioned complementarily to screw holes in said transmission housing and operable to receive screws to secure said member to said housing while testing the transmission therein.

5. The adaptor means according to claim 3 further characterized by said plate-like member having viewing means therein to permit observation of the functioning of the transmission mechanism while being tested.

6. The adaptor means according to claim 5 further characterized by said viewing means being transparent.

7. The adaptor means according to claim 5 further characterized by said plate-like member being formed from metal and the transparent portion thereof comprises a window opening therein covered by transparent means.

8. The adaptor means according to claim 4 further characterized by said plate-like member having an out-line complementary to at least part of the housing to which it is connectable, and said adaptor means including a gasket complementary in shape to the co-engageable surfaces of said member and housing to which it is connectable to effect a seal between the nozzle-receiving openings in said member and the open ends of passages and conduits in said housing with which they communicate.

9. The testing means according to claim 3 further including indicating means on said adaptor respectively adjacent the nozzle-receiving openings and indicative of the part of the automotive transmission with which the open end of the passage or conduit adjacent each nozzle-receiving opening communicates, thereby making it unnecessary to refer to service manuals to identify the various open ends of said passages and conduits.

10. The testing means according to claim 4 further characterized by said screw-receiving holes in said plate-like member being of a uniform size which is different from the size of the nozzle-receiving openings therein, thereby visibly to distinguish said holes from said openings incident to connecting said member to said transmission housing.

No references cited.